United States Patent [19]

Greene

[11] Patent Number: 5,074,707

[45] Date of Patent: Dec. 24, 1991

[54] WAVE ABATEMENT DEVICE

[76] Inventor: Richard M. Greene, 3392 Oaklawn Ave., Southold, N.Y. 11971

[21] Appl. No.: 199,947

[22] Filed: May 27, 1988

[51] Int. Cl.⁵ .............................................. E02B 3/04
[52] U.S. Cl. ...................................... 405/27; 405/30; 405/35
[58] Field of Search ...................... 405/30, 21, 23, 25, 405/26, 28, 35, 27

[56] References Cited

U.S. PATENT DOCUMENTS

| | | |
|---|---|---|
| 1,353,001 | 9/1920 | Uriarte . |
| 1,397,025 | 11/1921 | White . |
| 2,652,692 | 9/1953 | Hayden . |
| 3,197,963 | 8/1965 | Frederiksen . |
| 3,846,990 | 11/1974 | Bowley ............................ 405/26 |
| 3,884,042 | 5/1975 | Anderson et al. . |
| 4,073,145 | 2/1978 | Fair ................................. 405/33 |
| 4,098,086 | 7/1978 | Desty et al. . |
| 4,479,740 | 10/1984 | Schaaf et al. . |

FOREIGN PATENT DOCUMENTS

| | | |
|---|---|---|
| 1634155 | 8/1966 | Fed. Rep. of Germany . |
| 3540824 | 5/1987 | Fed. Rep. of Germany . |
| 1517957 | 3/1968 | France ............................ 405/21 |
| 091208 | 5/1983 | Japan . |
| 576047 | 5/1976 | Switzerland . |
| 673689 | 7/1979 | U.S.S.R. ........................ 405/28 |
| 1101503 | 7/1984 | U.S.S.R. ........................ 405/30 |
| 1250608 | 8/1986 | U.S.S.R. . |
| 002494 | 11/1858 | United Kingdom . |

OTHER PUBLICATIONS

Mark's Handbook for Mechanical Engineers, 8th ed., 1978, McGrew Hill.
Chapter 9 of the CRC Handbook of Coastal Processes and Erosion (1983).
Coastal Engineering, 8 (1984), pp. 199–217.
CRC Critical Review in Environment Control, Sep. 1976, pp. 259–296.

*Primary Examiner*—Dennis L. Taylor
*Assistant Examiner*—J. Russell McBee
*Attorney, Agent, or Firm*—Grimes & Battersby

[57] ABSTRACT

There is provided a wave attenuation device for abating waves and therefore erosion of a shorefront or marina of a body of water. The device includes a plurality of spaced apart, elongated plates for receiving waves therethrough. The plates are retained together by a plurality of vertical supports. The device may include a structure to anchor the device in place in a body of water.

11 Claims, 3 Drawing Sheets

5,074,707

WAVE ABATEMENT DEVICE

BACKGROUND OF THE INVENTION

1. Field of the Invention

This invention relates to a wave abatement device and, more particularly, to an abatement device which dissipates energy in waves and stops the chronic erosion process that occurs along shorefronts.

The ability of the shoreline or shorefront to withstand the force of the waves, and therefore to also withstand erosion, is important particularly where there are homes, businesses and other structures present on the property or the property has an aesthetic appearance that needs to be maintained. Normally, such shorefront property is at a premium both in availability and cost. Erosion of shorefronts, as widely known, occurs because of storms and hurricanes, but, as less widely known, also occurs because of the daily, continuous effect of waves striking the shorefront. Specifically, the more turbulent or shorter period or higher frequency waves, with frequency being a function of the height and period of the wave, the less time the sand which is carried in the wave has to drain out onto the shorefront and also the less time sand already on the beach has to dissipate the force or energy of the wave and thereby prevent being carried away from the beach with the backwash of the wave. Concerning the latter, the water absorption capability of the beach, which is the important dissipator of wave energy, is decreased so that there results an increased backwash energy that moves the sand seaward.

Should one intend to protect a man-made structure, such as a marina, in a body of water, it is necessary to dissipate the energy of the wave before the wave strikes the structure. If the energy of the wave is not dissipated, the continued pounding of the structure by the waves shall cause the structure to eventually crumble. Further, if the energy of the waves is not dissipated then the shorefront may erode and the marina may be damaged.

A longshore movement of sand, known as littoral drift, has been found to be advantageous since it moves sand towards the shoreline thereby replenishing the beach or shorefront. Littoral drift has its greatest effect in replenishing the shorefront during calm water surges to the beach, which normally occur during late spring to mid-summer, since such surges provide more than adequate time to dissipate the energy of the wave so that there is virtually little, if any, backwash energy. Accordingly, the sand builds up on the beach or shorefront.

2. Description of the Prior Art

The two common ways to control erosion and dissipate wave energy, along shorefronts have been heretofore by non-structural and structural stabilization efforts. Non-structural efforts, which have been preferable, involve either the planting of beach grass which acts to capture sand, or the placing of large quantities of sand on the beach, or a combination of both. The planting of beach grass is still normally insufficient to retain enough sand to avoid erosion, and is not possible when a man-made structure. such as an oil rig and the like is to be protected from the waves. The replacement of sand or the transporting of sand to a beach or a marina is very expensive as well as time consuming. Accordingly, no non-structural stabilization effort has proven totally satisfactory to abate erosion.

The variety of structural stabilization efforts include the building of walls, such as jetties and groins, perpendicular to the beach (or marina) to trap sand and hence build up the beach, and the building of walls parallel to the beach, such as longard tubes, seawalls and bulkheads to deflect the waves, and therefore the wave forces, from striking the beach. Each of these structural stabilization efforts has proven to have serious drawbacks which include short design life, the potential for causing subsequent greater damage to the beach, and their erosion effect on downdrift beach or shorefront areas.

For example, as discussed in Chapter 9 of the CRC Handbook of Coastal Processes and Erosion (1983), walls built perpendicular to the beach, namely jetties, have been found to block the littoral drift. By doing so, the sand is prevented from reaching the downdrift side so that while sand is captured at the desired location, neighboring downdrift locations erode even faster. Likewise, a groin, which is a rib built approximately perpendicular to the beach or shoreline, traps the littoral drift so that the local updrift side of the shoreline is built up. Unfortunately, as with jetties, groins build up the updrift side by preventing sand from reaching the downdrift side so that the neighboring downdrift side erodes even faster. The building of several groins in succession increases the build-up of the updrift side, while simultaneously increasing the rate of erosion of the downdrift side. Further, jetties, groins, and other such breakwater means are designed to be struck by waves. This action causes their bases to erode rather quickly, and therefore these structures shall readily require replacement. Still further, these type structures are very costly to construct.

Walls constructed parallel to the shoreline, such as longard tubes, seawalls and bulkheads or breakwaters, deflect waves, instead of absorbing the waves. Accordingly, these structures also erode rather quickly, thus causing their materials to wash-up on the shorefront. Also, each of these structures has been found to produce other deleterious effects. For example, Coastal Engineering, 8 (1984) pp.199-217, in an article titled: Performance Documentation of the Longard Tube at Del Mar, Calif. 1980-1983 by R. E. Flick and B. W. Waldorf, states that the study monitoring the Longard Tube installation at Del Mar beach from December 1980 until early 1983 principally concluded that the tube as configured was not substantial enough barrier to effectively prevent beach erosion during severe storm events. Specifically, the Longard Tubes, which are low-cost sand-filled plastic tube devices positioned parallel to the shoreline, were found inadequate to prevent large waves from overtopping the tube thereby producing localized sand scour on the shoreward side as the water returned seaward. As the scouring continued, the water returning seaward poured over the tube and began to also scour channels on the tube's seaward side. This process continued to perpetuate until the tubes were rendered totally ineffective. Also, a seawall, as stated in CRC Critical Reviews in Environmental Control, September 1976, pp. 259-296, in an article titled: Beach Erosion: Causes, Processes, and Remedial Measures by Dean, results in greater erosion at the location of the seawall toe than if the seawall were not present. Further, the seawall, as with any structure deflecting the waves, has its base scoured out so that the base of the seawall will eventually erode.

Recognizing the ineffectiveness of the above known processes to abate erosion, others have directed their attention toward decreasing the energy in waves before the waves strike the shorefront. For example, U.S. Pat. No. 3,197,963 to Frederiksen, which issued on Aug. 3, 1965, is directed to an apparatus which serves as a temporary breakwater by attempting to attenuate the wave action and to decrease the relative height of the peak with respect to the bottom of the trough of the wave. Specifically, the apparatus includes a plurality of enclosed, elongated hollow bodies oriented in a single row and in side-by-side relation so that each of the elongated bodies extends in the direction of wave travel. Each body has a bladder-like upper portion and a rigid bottom. The enclosed body is provided with a quantity of gaseous fluid, such as air, preferably up to approximately 40% to 60% of its volume capacity. When the hollow tube is anchored submerged in the water, it operates as follows. As the crest of the wave imposes upon the top exterior of the partially inflated hollow body, the bladder upper portion collapses under the crest to thereby collapse a portion of the chamber. However, due to the influence of the water at the trough, the air pocket formed under the trough travels along the hollow body. This action causes a collapse of the wave crest and the filling of the trough by the generation of another wave. Clearly, this is a temporary measure which would necessarily not last for a long period of time due to the natural dissipation of the gas, as well as the probability that it would not have any significant effect on high frequency waves.

An apparent attempt to combine the deflection and wave absorption or abatement concepts to abate erosion is U.S. Pat. No. 1,353,001 to Uriarte, which issued on Sept. 14, 1920. It is directed to a breakwater or the like. Specifically, the breakwater includes a solid masonry or other suitable structure comprising a series of substantially horizontal perforated diaphragms one above the other, and vertical cutwaters in front of the diaphragms. Waves striking the structure are divided into a number of vertical sections, and then are subdivided vertically by the diaphragms. The problem with this structure is that it is costly, and possibly may erode by the water striking it.

SUMMARY OF THE INVENTION

Against the foregoing background, it is a primary object of the present invention to provide a wave abatement device which can also serve as an erosion abatement device.

It is another object of the present invention to provide such an abatement device which dissipates the energy of the wave prior to striking the location to be protected, such as a marina or a shorefront, thereby reducing the turbulence of the wave.

It is a further object of the present invention to provide such an abatement device which shall reduce the turbulence of the wave by flattening or running-out the trough of the wave.

It is still another object of the present invention to provide such an abatement device which shall dissipate the wave force in front of the marina or shorefront.

It is yet another object of the present invention to provide such an abatement device which allows material, such as sand, normally found in the wave to be flushed through the device and eventually on the shorefront.

It is yet still another object of the present invention to provide such an abatement device which does not interfere with littoral drift.

It is still yet another object of the present invention to provide such an abatement device which shall both transform high frequency or turbulent waves to calm water waves and the waves continue in the same direction but in a calm fashion.

It is still yet another object of the present invention, in an alternative embodiment, to provide such an abatement device which also redirects the waves in a direction perpendicular to the marina.

It is still a further object of the present invention to provide such an abatement device which strategically abates waves and then accretes the existing shorefront without the use of additional protection structures, and without any deleterious effect to downdrift shorefront.

To the accomplishments of the foregoing objects and advantages, the present invention, in brief summary, is a device for abating a wave, and thereby abating erosion of a shorefront, of a body of water. The device comprises a plurality of relatively flat plates spaced from each other so as to form a space between each adjacent pair of plates. The plurality of plates may be positioned so that their centerline is basically perpendicular to a front of marina of the body of water. This device also comprises means for retaining the plurality of plates in position with respect to each other, and may include means for securing the plurality of plates in position in the body of water.

BRIEF DESCRIPTION OF THE DRAWINGS

The foregoing and still other objects and advantages of the present invention will be more apparent from the following detailed explanation of the preferred embodiments of the invention in connection with the accompanying drawings wherein.

DESCRIPTION OF THE PREFERRED EMBODIMENTS

Figure 1:
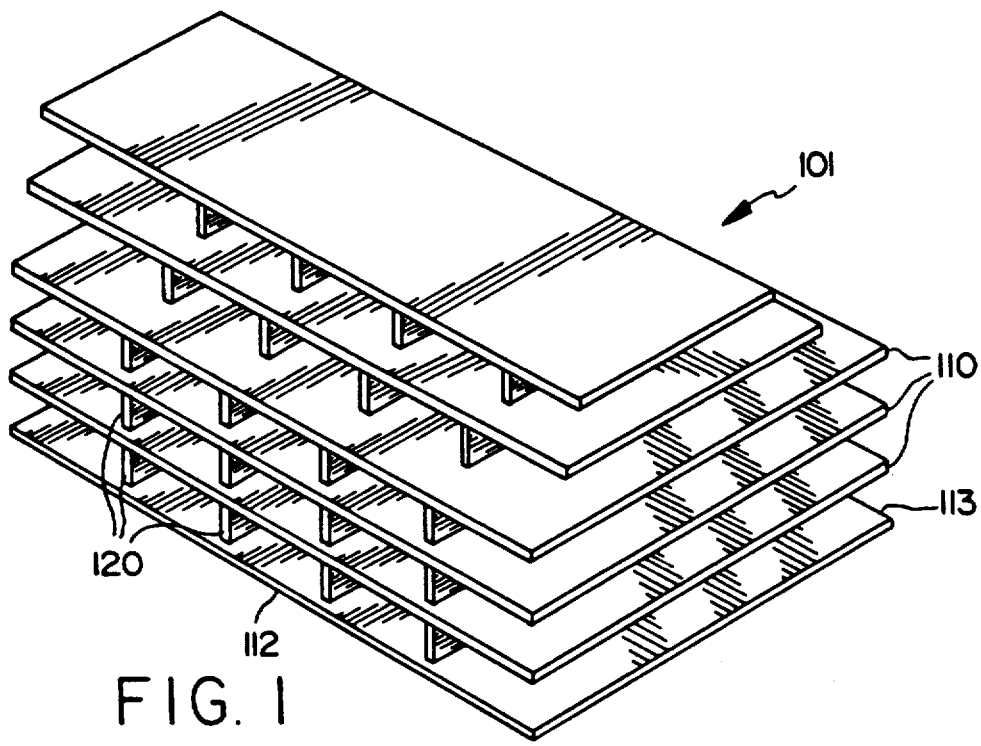
FIG. 1 is a perspective view of the device of the present invention.

Referring to the Figures, and in particular FIG. 1, there is provided a wave attenuation or abatement device or system generally represented by reference numeral 101. The device 101 includes a plurality of horizontal plates 110 which are held or retained together by a frame 120. The device is anchored in the body of water by anchoring means (not shown).

Figure 2:
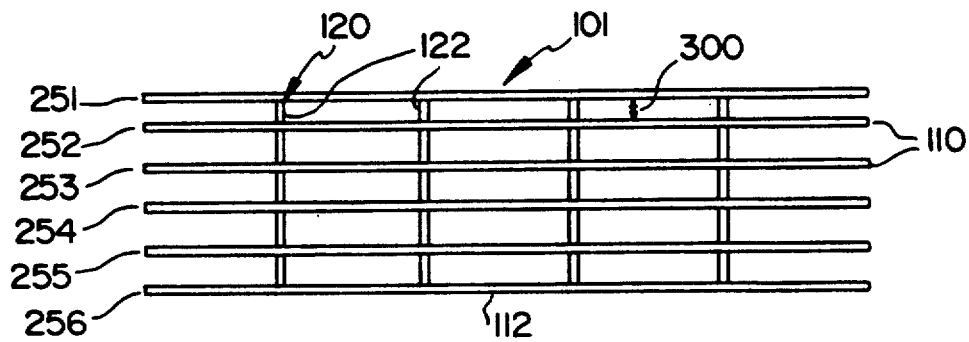
FIG. 2 is a front elevation view of the device of FIG. 1.
Figure 3:
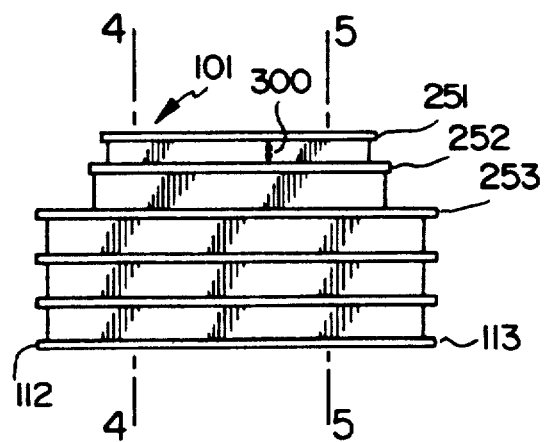
FIG. 3 is a side elevation view of the device of FIG. 1.

Referring to FIGS. 1-3, each plate 110 is rectangular in shape. It is believed for most purposes that each plate 110 should have its center axis or axial direction basically in the direction water is directed through the device 101. In other words, each plate 110 is positioned so that the one end 112 of the plate faces directly toward the shorefront or the marina which is to be protected and the other end 113 faces opposite the shorefront. Thus, the centerline or axis of each elongated plate 10 is basically perpendicular to the shoreline of the beach or the marina to be protected and is in the direction of the wave propagation. It should be understood that the direction of placement, however, need not be perpendicular especially, if as described below, the vertical supports 120 are only sectional strips 128.

The number of the plurality of plates 110 or the height of the device 101 is determined by the depth of the water where the device is placed, and therefore the distance of the device from the marina or other structure, the topography of the area, and the depth to which the device shall be placed in the water.

The distance the device 101 is placed from the marina or shorefront is determined by the environmental criteria of the area. The objective is to place the device as far as possible from the marina or shorefront so as to maximize the area of shorefront build-up and for the aesthetic reason of not having any structure in water near the marina or shorefront. However, the distance from the marina or shorefront is limited by the fact that the device can not be too far so as to permit winds to get between the device and the shorefront and thus create other undesired conditions. For example, in the eastern end of the south shore of Long Island in New York State, it has been found that an erosion abatement device made of four rows of tubes, which is the subject of a copending application by the same inventor but assigned to Erosion Protection Devices, Inc., should be placed, as measured from the center (axially) of the device, approximately two hundred and fifty to three hundred feet from the shoreline. At this position, the depth of the water is approximately twenty to twenty-five feet. In one preferred embodiment, the device 101 is high enough out of the water so that no more than approximately twenty percent of the highest wave would reach the top of the plate, i.e. the top of the device. Specifically, the midpoint of the second row of plates should be at the calm water line, and the bottom of the bottom plate would be approximately ten to fifteen feet from the floor of the body of water. It is believed that by this placement the device shall achieve optimum reduction or abatement of all waves, no matter how turbulent. Moreover, the device by this placement does not obstruct the desired littoral drift since that drift would pass under the device.

It should be understood that the device of the present invention provides that should the turbulent waves in the particular area be very high, it may be necessary that more than two plates be above the calm water line. However, the size of the plates should follow the same principles set forth above.

The device 101, preferably, has from three to six plates. It is believed that the device 101 functions with only three plates 110 in which instance it is preferred that the top plate 251 be above the calm water line although the top of the top plate 251 could be at the calm water line. However, it is believed that a six plate structure with the top plate 251 and the next to the top plate 252 above the calm water line should be used to achieve optimum wave attenuation results. In such a preferred embodiment, the plates 251 and 252 are positioned above the calm water line and plate 253 is positioned approximately at the calm water line. Accordingly, plate 254 is positioned below the calm water line but is affected by the trough of the wave, while plates 255 and plate 256, the base or lowermost plate, are provided in the portion of the water which is unaffected by the waves. The base plate 256 is provided primarily to provide neutral buoyancy to the device 101, i.e., to minimize and optimally prevent the up and down movement of the device 101 and secondarily to anchor the device. Plates 255, 256, and any additional plates (not shown) provided in the unaffected portion of the water, increase the neutral buoyancy of the device 101, however the cost of the device and the strength of the anchoring means needed to prevent the device from shifting toward the marina or shorefront would likewise be increased. Thus, to primarily provide optimum wave attenuation and to secondarily provide minimum cost, it is believed that five to six plates at most is preferred with two of the plates above the calm water line and the third plate at the calm water line.

Further, to increase buoyancy, it is found that the vertical distance or vertical space 300 between the plates should vary. Specifically, it is preferred that the distance 300 between the top plate 251 and the second plate 252 be approximately two-thirds of the distance between the second plate 252 and the third or calm water line plate 253. However, the distance between the second plate 252 and the third plate 253 should be the same as the distance between the third plate 253 and the fourth plate 254. Thereafter, the distance between the fourth plate 254 and the fifth plate 255 shall be approximately two-thirds of the distance between the fifth plate 255 and the sixth plate 256. The approximate two-thirds ratio shall continue until the base plate is reached should there be more than six plates. Thus, the formula is that the distance or space 300 between a plate and the adjacent above plate is approximately two-thirds of the distance between that plate and the its adjacent lower plate, except that if the plate is at a calm water line the distance between both of its adjacent plates is equal.

It is believed that in a someday standard commercial device 101, the distance between the first plate 251 and the second plate shall be approximately four inches, the distance between the second plate and the third or calm water line plate 253 and the distance between the third plate 253 and the fourth plate 254 shall be approximately six inches, the distance between the fourth plate 254 and the fifth plate 255 shall be approximately nine inches, and the distance between the fifth plate 255 and the sixth plate shall be approximately eleven to twelve inches.

It is desired that each plate be as thin as possible. Specifically, the plates need to be only thick enough to avoid bending. Therefore considering the thinness of the plates, the overall height of the device 101 may be as little as just over three feet.

To also optimize wave abatement, the plates 110 have the radial staggering as shown in FIG. 3. By the staggering, the trough of the wave starts to contact the lower plate before the peak of the wave has reached the adjacent upper plate. Accordingly, the abatement of the wave shall start sooner, yet the structure shall be less in size and in weight. Specifically, the plates 251 through 256 have an axial extent that varies according to the position of the plate with respect to the calm water line. The top plate 251 is of a smaller axial extent than any other plate for the reason of maintaining the optimum abatement of the turbulent wave yet minimizing the weight of the device. The second plate 252 which in the embodiment shown is above the calm water line, has an axial extent which is greater than that of the top plate 251 but less than that of the third plate 253. The third plate 253 is at the calm water line and all of the remaining plates are below the calm water line; therefore, all of these plates should be of the same axial extent.

It is important that the axial extent of the third or calm water line plate 253 be approximately one-half of the axial extent of the wavelength of the turbulent waves that occur in that area and that the axial extent of the base plate 256 be slightly greater than the axial extent of the wavelength of the wave. In the shown second embodiment the base plate 256 and the third plate 253 are equal and slightly greater than the axial extent of the wavelength of the wave.

There is a correlation for the plates affected by the wave between the height or space between a first plate and the plate above it and the axial extent of that first plate. Specifically, the axial extent of the plate should be six to eight times greater than the space between that plate and the adjacent upper plate. It should be noted that if the device was used to abate long period waves which are waves that do not normally cause erosion and damage to the shorefront and the marina, the axial extent of the wavelength of these waves are longer and therefore the axial extent of the plates may be longer; however the above ratio of the space above that plate to axial extent of that plate should still remain the same or possibly increase to a ratio of ten, instead of six to eight, to one. Further, it may be that there is a correlation between the height of the device and the height of the wave and that the height of the device should be approximately five times greater than the height of the wave.

Figure 7:
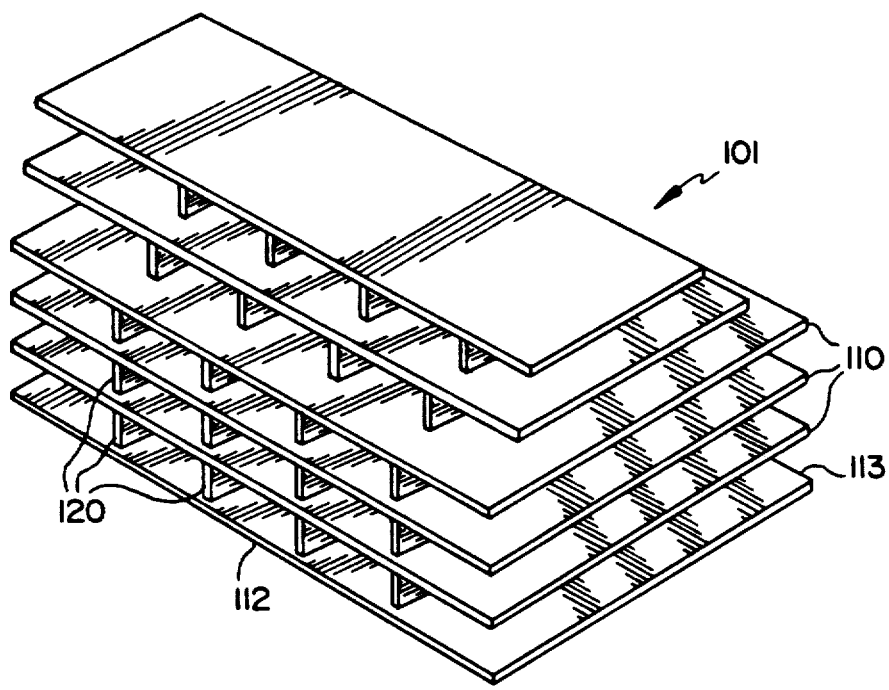
FIG. 7 is a perspective view of an alternative embodiment of the present invention.
Figure 8:
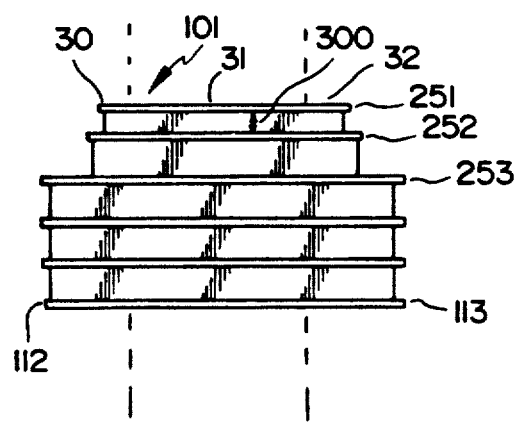
FIG. 8 is a side view of the device of FIG. 7.

The frame 120 includes a plurality of vertical, preferably, equally spaced supports 122. The vertical supports 122 can be of any configuration provided each support retains together the two adjacent plates. The frame can be connected to the plurality of plates 110 by any conventional means such as glue, nails, welding and the like dependent upon the type of material used for the plates and the supports. In the embodiment shown, the vertical supports 122 are merely strips 128, as best shown in FIG. 3, which hold the plates 110 together. These strips can be placed anywhere between the plates, however, it is preferred that the strips form the two vertical rows towards the ends of the plates as shown in FIG. 3. In the alternative embodiment shown in FIGS. 7 and 8, the device 101 is intended to redirect the waves. Accordingly, the supports should be rectangular sections which run along basically the entire axial extent of the plates. Thus, each pair of plates and each pair of sections form a hollow enclosure with only the ends 112 and 113 of the plates open.

The plurality of plates 110 have an axial extent which is positioned approximately perpendicular to the marina or man made or shorefront structure that is intended to be protected. The vertical supports 122 are positioned so as to sufficiently retain all of the plates together while the device 101 is in use. By the combination of the plates 110 and the vertical supports 122, although it may be due to the plates alone, the water is directed approximately axially through the device 101. In other words, should the wave approach the end 112 of the device 101 in a direction not approximately perpendicular to the marina, the device, and again perhaps only the plates 110, shall redirect the wave, as well as dissipate the wave's energy, so that the wave exits the device basically perpendicular to the intended marina.

Each of the plurality of plates 120 and the supports 122 should be made of a material that is corrosion-resistant. Further, the material should have the secondary attributes of being readily available, inexpensive, easily workable and light in weight. Accordingly, plastic, wood and aluminum and other corrosion-resistant materials and the like are preferred.

The entire device can be anchored to the floor of or in the body of water by an anchoring means. The anchoring means can include any conventional structure which is corrosion-resistant. The primary function of the anchoring means is to minimize the amount of shifting of the device towards the shorefront. A second, but less important function is that the anchoring means assists in having the device obtain a neutral buoyancy. While the exact anchoring structure is not important, it has been believed that a block and tackle arrangement may suffice. However, it is believed that for anchoring the device to pilings, a springline type anchoring is needed so as to adjust to the changes in elevation of the device caused by the water's movement.

While not known for certain it is believed that the abatement of the wave is caused by the attraction of the wave, specifically the trough, to the exposed top surfaces of the plates. It is that attraction which is believed to cause the dissipation of the wave's energy. Accordingly, the exact structure of the device 101 is to optimize the efficiency of the abatement versus minimizing the cost and weight of the devices. However, it is believed that the principles of this invention are practiced by the placement of surfaces which provide exposed surfaces of a sufficient axial extent as compared to the axial extent of the period of the waves so as to permit the waves to flatten or run-off and thereby become calm.

Concerning the operation of the device 101 in which the vertical supports are rectangular sections along the axial extent of the plates 110, the waves normally directed at various angles toward the shoreline enter at end 112 of the plates 110 so that the spaces 300 between the plates redirect the waves through the plates, i.e. in the direction basically perpendicular to the shoreline or the wave propagation direction.

Figure 4:
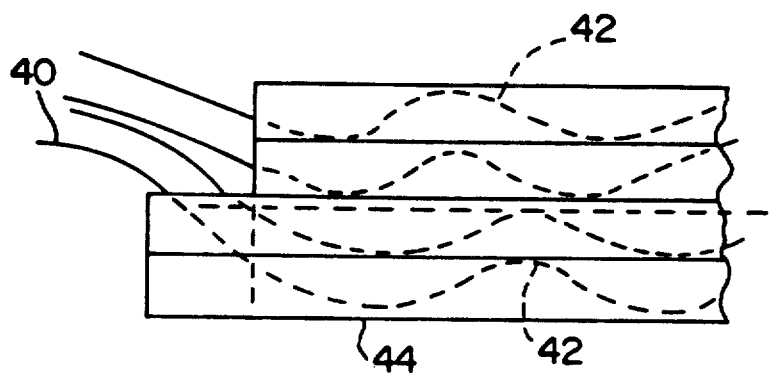
FIG. 4 is an exploded segment view of the segment from the front end to line 4—4 of FIG. 3.
Figure 5:
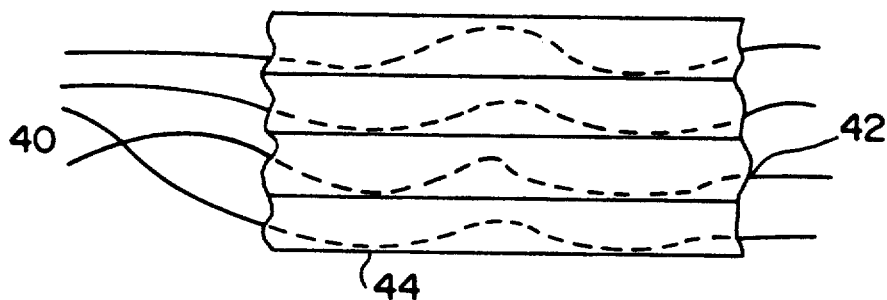
FIG. 5 is an exploded segment view of the segment from line 4—4 to line 5—5 of FIG. 3.
Figure 6:
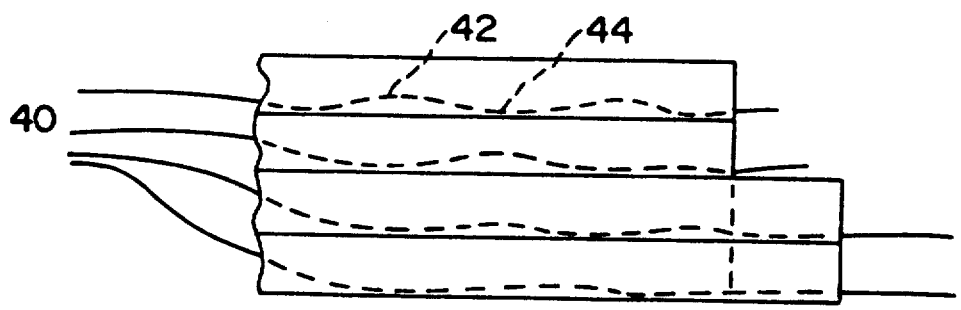
FIG. 6 is an exploded segment view of the segment from line 5—5 to back end of FIG. 3.

As shown in FIG. 3, and no matter whether the vertical supports 122 are strips 128 shown in FIG. 3 or rectangular sections, the plates 110, for purposes of wave propagation discussions, are broken down into areas 30, 31 and 32 which are enlarged in FIGS. 4 through 6, respectively. As defined in the present invention and as universally defined, a short wave is usually a high turbulent wave 40, i.e., one in which the crest 42 and the trough 44 are rather large in comparison to the period, and subsequent waves occur in rapid succession. It should be noted that turbulent waves are short period waves and these are the waves that cause the greatest damage to the beach or shorefront since they provide much less time for sand in the wave to be deposited on the shorefront and their continued striking of the shorefront causes erosion of the sand already on the shorefront.

As shown in FIG. 4, waves 40 when first entering the space between the plates 110 have a very high frequency. As the waves pass in the spaces 300 between the plates, as shown in FIGS. 5 and 6, the water of the trough of the wave is attracted to and tries to follow the exposed top of each plate. The exact phenomenon is not known, however it has been found that the trough or portion of the wave that contacts these surfaces is attracted thereto thereby causing the wave to flatten or run-out as close to the surface as possible.

As the waves 40 continue through the spaces 300 between the plates 110, as shown in FIGS. 5 and 6, the wave continues to contact the top surface of the plates and, thus, the waves continue to flatten or run-out such that the waves exiting the device 101 have very little height and are calm. Accordingly, it is believed that any surface which is made to contact the trough of the waves shall attract the wave and cause it to become calmer, however the surface should be relatively flat and long enough so that the wave's trough contacts the surface for a sufficient duration. Therefore, the length or the axial extent of the device 101 is important. One would prefer to have it as short as possible for the reasons of minimizing cost in materials and labor, workability, and less obtrusive to the public. However, to optimize effectiveness, the axial length of the plates which effect the wave should be approximately one half of the axial extent of the wavelength of the wave, and the axial length of the plates unaffected by the wave should be slightly longer than the axial extent of the wavelength of the wave in order to provide stability to the device 101. Further, it is believed that a correlation exists between the axial length of the plates and the space between the plates. Specifically, the axial length of each plate should be approximately six to eight times more than the space between that plate the the adjacent plate above that plate for all plates that have an effect on the wave. Further, there may be a correlation between the height of the device 101 and the height of the wave. It is believed that the height of the device 101 should be approximately five times the height of the wave.

The width, i.e. the extent of the device 101 parallel to the intended surface of the marina can be of any width. The only criterion is the amount of the shorefront or marina surface that one wishes to protect.

It is believed that littoral drift is not adversely effected by the present invention. Specifically, the littoral drift can pass, virtually completely, under the device 101. Therefore unlike other systems that have heretofore been used to attempt to abate erosion, downstream of the area effected by the device still receives the benefits of littoral drift so that increased erosion does not occur downstream.

By the present invention, it has been found that turbulent waves pass through the plurality of plates so as to be calmed and then continue to the shorefront. Thus, the device or system 101 attenuates the waves by flattening or running-out the trough and thus the waves, so as to produce a calming effect such that the resulting waves, i.e., waves exiting the plates and striking the shorefront or marina, are calm. Still further, the particular structure does not adversely affect littoral drift.

Having thus described the invention with particular reference to the preferred forms thereof, it will be obvious that various changes and modifications may be made therein without departing from the spirit and scope of the invention as defined by the appended claims.

Wherefore, I claim:

1. A wave abatement device for dissipating energy in waves of a body of water before the waves strike a surface of a structure, said device comprising:
    at least three elongated plates, each of said at least three plates being spaced from an adjacent plate and having an axial centerline positioned basically perpendicular to the surface of the structure, said at least three plates being buoyant in the body of water with a first plate positioned above the calm water line, a second plate positioned approximately at the calm water line and a third plate positioned below the calm water line of the body of water, wherein said first, second and third plates have a different axial extent, said first plate having an axial extent less than that of said second plate and said second plate having an axial extent less than that of said third plate; and
    means for retaining said at least three plates in position with respect to each other,
    wherein waves exiting said device are calm as compared to the same waves as they entered said device.

2. The wave abatement device of claim 1, wherein said retaining means includes a plurality of spaced apart vertical supports for connecting together said plurality of plates.

3. The wave abatement device of claim 1, wherein said at least three plates are spaced apart and the spaces therebetween receive waves and direct the waves in a direction basically perpendicularly to the surface of the structure.

4. The wave attenuation device of claim 1, further comprising means for anchoring said device in position in the body of water.

5. The wave abatement device of claim 1, wherein each of said plurality of plates is made of a corrosion-resistant material.

6. The wave abatement device of claim 1, wherein the axial extent of each of said plates is six to eight times greater than the vertical space between that plate and the above adjacent plate.

7. The wave abatement device of claim 1, wherein the height of said device is approximately five times greater than the height of a normal turbulent wave.

8. The wave abatement device of claim 1, wherein the space between said first and said second plates is less than the space between said second and said third plates.

9. The wave abatement device for dissipating energy in waves in a body of water before the waves strike a surface of a structure, said device comprising:
    at least five plates, each of said at least five plates being spaced from an adjacent plate and having an axial centerline positioned basically perpendicular to the surface of the structure, said at least five plates being buoyant in the body of water with two plates positioned above the calm water line and with one plate positioned approximately at the calm water line and the remainder of said at least five plates positioned below the calm water line of the body of water, wherein each of said two plates above the calm water line have an axial extent less than that of said one plate approximately at the calm water line and said plate approximately at the calm water line has an axial extent less that each of said plates below the calm water line; and
    means for retaining said at least five plates in position with respect to each other,
    wherein waves exiting said device are calm as compared to the same waves as they entered said device.

10. The wave abatement device of claim 9, wherein said two plates above the calm water line and said one plate approximately at the calm water line each has an axial extent which is six to eight times greater than the space separating that plate and the plate adjacent and directly above that plate.

11. The wave abatement device of claim 10, wherein said two plates above the calm water line have an axial extent less than that of the remaining plates, and wherein between said two plates the topmost plate has an axial extent less than that of the other plate.

* * * * *